(12) United States Patent
Ohashi et al.

(10) Patent No.: US 12,337,890 B2
(45) Date of Patent: Jun. 24, 2025

(54) BRAKE CONTROL DEVICE

(71) Applicant: EXEDY Corporation, Neyagawa (JP)

(72) Inventors: Yusuke Ohashi, Neyagawa (JP); Taichi Kitamura, Neyagawa (JP); Hitoshi Katsura, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 412 days.

(21) Appl. No.: 17/877,684

(22) Filed: Jul. 29, 2022

(65) Prior Publication Data

US 2023/0068277 A1 Mar. 2, 2023

(30) Foreign Application Priority Data

Aug. 30, 2021 (JP) ................... 2021-140121

(51) Int. Cl.
*B62B 5/04* (2006.01)
*A61G 5/10* (2006.01)

(52) U.S. Cl.
CPC .......... *B62B 5/0447* (2013.01); *A61G 5/1032* (2013.01)

(58) Field of Classification Search
CPC ....... B62B 5/0447; B62B 5/063; A61G 5/047; A61G 5/1032
See application file for complete search history.

(56) References Cited

U.S. PATENT DOCUMENTS

| 5,927,414 A * | 7/1999 | Kan | A61G 5/048 180/907 |
|---|---|---|---|
| 2019/0380893 A1* | 12/2019 | Kim | A61G 5/1051 |
| 2022/0233376 A1* | 7/2022 | Raja | A61G 5/0825 |

FOREIGN PATENT DOCUMENTS

| CA | 3212681 A1 * | 10/2022 | ............... B62B 3/02 |
|---|---|---|---|
| JP | 4495444 B2 | 7/2010 | |
| JP | 2022115570 A * | 8/2022 | ............... A61G 5/04 |
| KR | 102043079 B1 * | 11/2019 | |

* cited by examiner

*Primary Examiner* — Vishal R Sahni
(74) *Attorney, Agent, or Firm* — United IP Counselors, LLC

(57) ABSTRACT

A brake control device includes an operating switch and a control part. The operating switch is configured to be turned on when operated by a user. The operating switch is configured to be turned off when released from being operated by the user. The control part executes first brake processing for stopping the mobile object when the operating switch is switched off from on during traveling of a mobile object.

6 Claims, 10 Drawing Sheets

BRAKE CONTROL DEVICE

CROSS-REFERENCE TO RELATED APPLICATIONS

This application claims priority to Japanese Patent Application No. 2021-140121 filed Aug. 30, 2021. The entire contents of that application are incorporated by reference herein in their entirety.

TECHNICAL FIELD

The present invention relates to a brake control device.

BACKGROUND ART

It has been proposed to enhance the performance of a mobile object moved at a low speed such as a pallet truck, a hand lift truck, a hand truck, or a wheelchair by attaching a drive unit thereto. The drive unit includes an electric motor for rotationally driving a wheel, a control device for controlling the electric motor, and so forth. When traveling of the mobile object is made by a human drive force, the electric motor outputs an assist force for assisting the human drive force.

For example, Publication of Japan Patent No. 4495444 discloses a type of mobile object that the electric motor is configured to output the assist force depending on the acceleration of the mobile object.

With the configuration described above, the mobile object starts moving when a user leans against the mobile object or when the mobile object is disposed on the surface of a slope. Accordingly, the electric motor outputs an assist force depending on the acceleration of the mobile object. As a result, occurrence of unintended traveling of the mobile object is concerned; hence, it is required to appropriately stop the mobile object.

It is an object of the present invention to appropriately stop a mobile object.

BRIEF SUMMARY

A brake control device according to an aspect of the present invention is a device for a mobile object including an electric motor. The brake control device includes an operating switch and a controller. The operating switch is configured to be turned on when operated by a user. The operating switch is also configured to be turned off when released from being operated by the user. The control part executes first brake processing for stopping the mobile object when determining that the operating switch is switched off from on during traveling of the mobile object.

According to this configuration, when the operating switch is released from being operated by the user, the control part executes the first brake processing, whereby the mobile object can be stopped. Because of this, even in occurrence of unintended traveling of the mobile object, the mobile object can be appropriately stopped.

Preferably, the control part executes the first brake processing after elapse of a predetermined waiting time.

Preferably, the operating switch includes a first switch and a second switch. The control part executes second brake processing for stopping the mobile object when determining that both the first switch and the second switch are turned on during traveling of the mobile object.

Preferably, the operating switch includes a first switch and a second switch. The control part controls the electric motor to output an assist force for forward movement when the first switch is turned on. On the other hand, the control part controls the electric motor to output the assist force for reverse movement when the second switch is turned on. The control part executes third brake processing for stopping the mobile object when determining either that the second switch is turned on during forward movement of the mobile object or that the first switch is turned on during reverse movement of the mobile object.

Preferably, the operating switch is configured to be turned on as either a first on state or a second on state when operated by the user. The operating switch is also configured to be turned off when released from being operated by the user. The control part controls the electric motor to output an assist force for forward movement when the operating switch is turned on as the first on state. On the other hand, the control part controls the electric motor to output the assist force for reverse movement when the operating switch is turned on as the second on state. The control part executes third brake processing for stopping the mobile object when determining that the operating switch is switched between the first on state and the second on state during traveling of the mobile object.

Preferably, the control part executes the brake processing with a brake force depending on the assist force of the electric motor.

Overall, according to the present invention, the mobile object can be appropriately stopped.

DETAILED DESCRIPTION

A brake control device according to an embodiment of the present invention will be hereinafter explained with reference to drawings. The brake control device (hereinafter simply referred to as "control device" on an as-needed basis) is configured to execute brake processing for a mobile object including an electric motor. The control device is installed in the mobile object. It should be noted that traveling of the mobile object is made by a human drive force. The mobile object is moved at a low speed. The mobile object is configured to transport an object. It should be noted that the term "object" is conceptualized as encompassing a person or so forth as well. A pallet truck, a hand lift truck, a hand truck, a wheelchair, or so forth is exemplified as the mobile object described above. It should be noted that in the present embodiment, the mobile object is the pallet truck.

<Pallet Truck>

Figure 1:
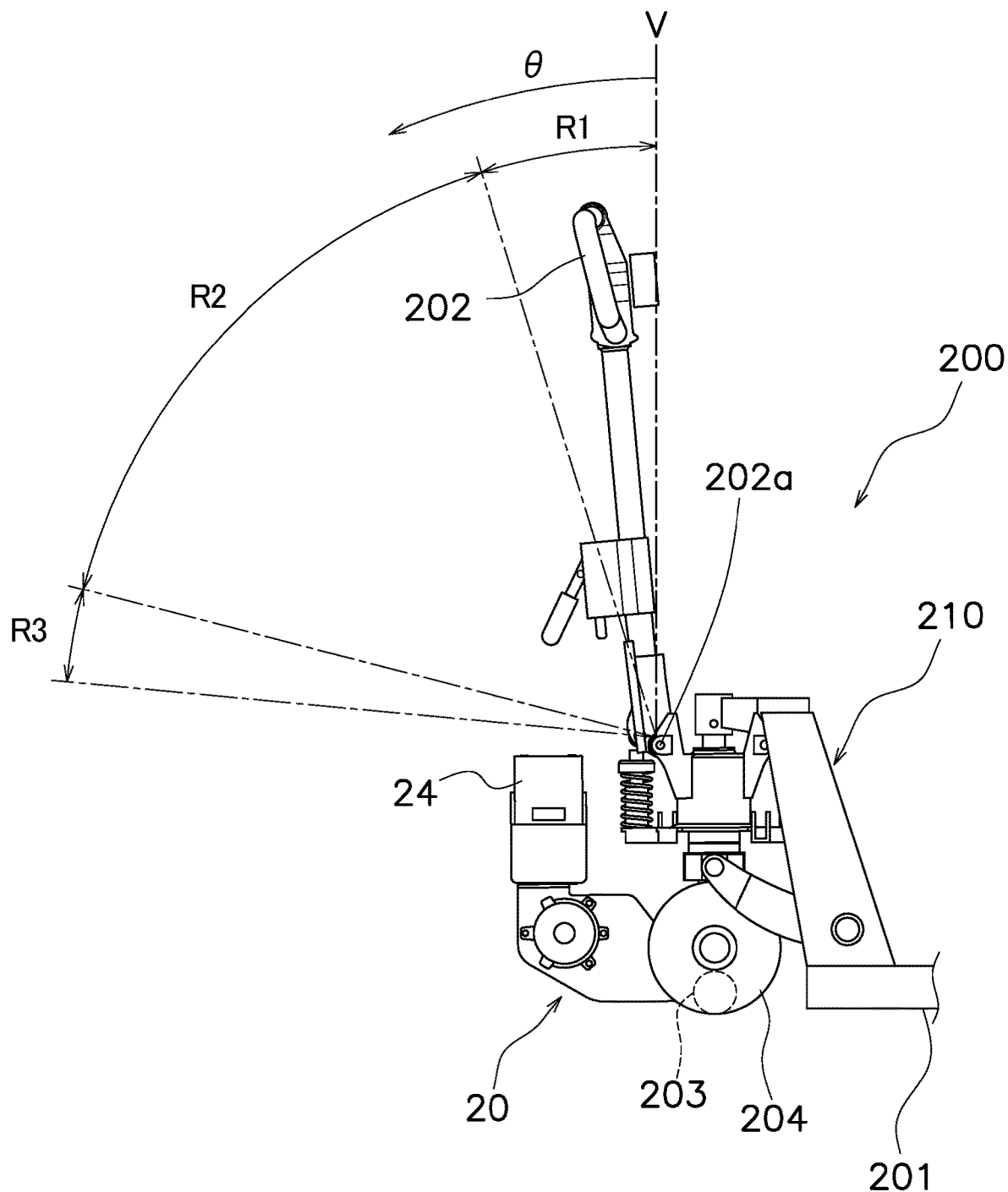
FIG. 1 is a side view of part of a pallet truck.

FIG. 1 is a side view of a pallet truck 200 in which the control device is installed. As shown in FIG. 1, the pallet truck 200 includes a pallet truck body 210 and a drive unit 20. The pallet truck body 210 includes a loading platform (a pair of fork arms) 201, an operating handle 202, and a plurality of vehicle wheels 204. The drive unit 20 is attached to the pallet truck body 210.

When the pallet truck 200 is moved leftward in FIG. 1, the movement is defined as forward movement; conversely, when the pallet truck 200 is moved rightward in FIG. 1, the movement is defined as reverse movement. Specifically, when the user pulls the operating handle 202, the pallet truck 200 is forwardly moved; conversely, when the user pushes the operating handle 202, the pallet truck 200 is reversely moved.

The operating handle 202 upwardly extends from the loading platform 201. Besides, the operating handle 202 is configured to be pivotable about a base end 202a. It should be noted that when pivoted, the operating handle 202 is tilted relative to a vertical axis V. A tilt angle θ, formed by the operating handle 202 and the vertical axis V, is changeable by pivoting the operating handle 202 about the base end 202a.

The range of the tilt angle θ formed by the operating handle 202 and the vertical axis V can be divided into a first range R1, a second range R2, and a third range R3. It should be noted that when the operating handle 202 is tilted within the first range R1, the tilt angle θ becomes the smallest; when the operating handle 202 is tilted within the second range R2, the tilt angle θ is larger than that when the operating handle 202 is tilted within the first range R1; when the operating handle 202 is tilted within the third range R3, the tilt angle θ is larger than that when the operating handle 202 is tilted within the second range R2.

For example, the range of the tilt angle θ can be set as follows, albeit not particularly limited thereto: the first range R1 is $0° \leq \theta < 20°$; the second range R2 is $20° \leq \theta < 60°$; the third range R3 is $60° \leq \theta \leq 90°$. Thus, when tilted within the first range R1, the operating handle 202 can be regarded as set in an upright state. On the other hand, when tilted within the second range R2, the operating handle 202 can be regarded as set in a tilt state. Yet on the other hand, when tilted within the third range R3, the operating handle 202 can be regarded as set in a lying state.

<Drive Unit>

Figure 2:
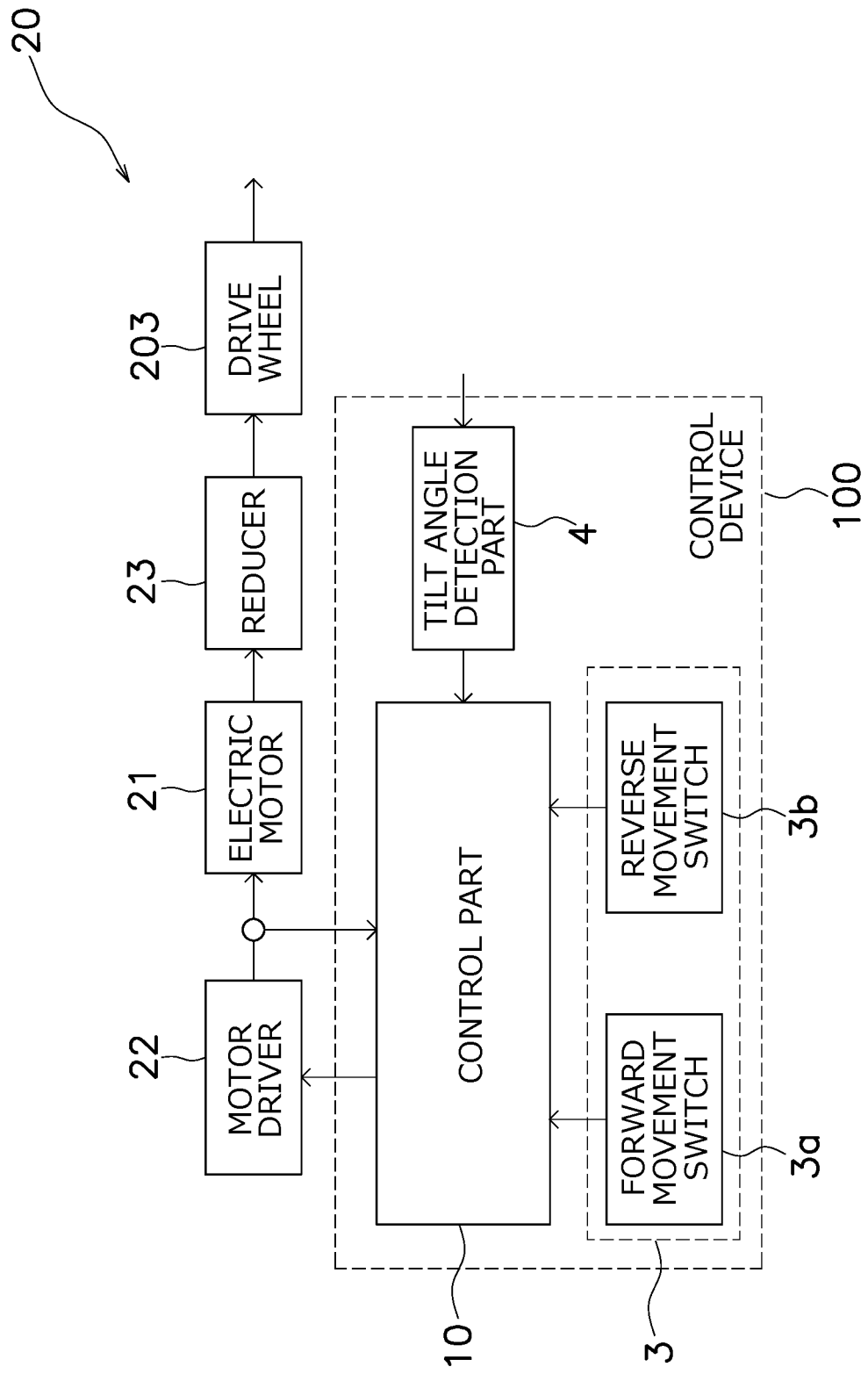
FIG. 2 is a block diagram of a drive unit.

As shown in FIG. 2, the drive unit 20 includes an electric motor 21, a motor driver 22, a reducer 23, a battery 24 (see FIG. 1), a drive wheel 203, and a control device 100. It should be noted that the drive unit 20 may not include the drive wheel 203. In this case, the drive unit 20 rotationally drives at least one of the vehicle wheels 204 of the pallet truck 200 instead of the drive wheel 203.

The electric motor 21 outputs an assist force for assisting traveling of the pallet truck 200. The electric motor 21 rotationally drives the drive wheel 203.

The motor driver 22 controls electricity to be supplied to the electric motor 21 from the battery 24. The motor driver 22 is connected to the control device 100 by wired or wireless means in communicable manner. The motor driver 22 drives the electric motor 21 in accordance with a control signal inputted thereto from the control device 100.

The reducer 23 reduces the speed of rotation of the electric motor 21 and transmits the rotation reduced in speed to the drive wheel 203. The reducer 23 is composed of, for instance, a plurality of gears and so forth.

<Control Device>

The control device 100 is configured to control the electric motor 21. The control device 100 includes an operating switch 3, a tilt angle detection part 4, and a control part 10.

The operating switch 3 is attached to, for instance, the operating handle 202. When operated by the user, the operating switch 3 is configured to be turned on; conversely, when released from being operated by the user, the operating switch 3 is configured to be turned off. In other words, the operating switch 3 is of a momentary type.

The operating switch 3 includes, for instance, a forward movement switch 3a (exemplary first switch) and a reverse movement switch 3b (exemplary second switch). Both the forward movement switch 3a and the reverse movement switch 3b are of the momentary type.

When the assist force is required in forward traveling, the user operates the forward movement switch 3a. For example, the forward movement switch 3a is a push-button switch. The user pushes the forward movement switch 3a. Only when kept pushed, the forward movement switch 3a is turned on.

Then, when released from being operated by the user, the forward movement switch 3a is turned off. For example, when the forward movement switch 3a, kept pushed by a finger of the user, is released from the finger, the forward movement switch 3a is turned off. It should be noted that the forward movement switch 3a is not limited to the push-button switch, and alternatively, for instance, can be a switch with a touch sensor such as a capacitive touch switch.

When the assist force is required in reverse traveling, the user operates the reverse movement switch 3b. For example, the reverse movement switch 3b is a push-button switch. The user pushes the reverse movement switch 3b. Only when kept pushed, the reverse movement switch 3b is turned on.

Then, when released from being operated by the user, the reverse movement switch 3b is turned off. For example, when the reverse movement switch 3b, kept pushed by a finger of the user, is released from the finger, the reverse movement switch 3b is turned off. It should be noted that the reverse movement switch 3b is not limited to the push-button switch, and alternatively, for instance, can be a switch with a touch sensor such as a capacitive touch switch.

It should be noted that when the assist force is not required, the user does not operate both the forward movement switch 3a and the reverse movement switch 3b.

The tilt angle detection part 4 is configured to detect the tilt angle θ of the operating handle 202 relative to the vertical axis V. For example, an acceleration sensor can be provided as the tilt angle detection part 4. Alternatively, a gyro sensor can be provided as the tilt angle detection part 4. Yet alternatively, both the acceleration sensor and the gyro sensor can compose the tilt angle detection part 4. Still alternatively, a tilt sensor, an angle sensor, a limit switch, or so forth can be provided as the tilt angle sensor 4. It should be noted that when the limit switch is employed, the tilt angle detection part 4 detects not a tilt angle per se but a tilt range.

For example, a computer (e.g., microcomputer), including a CPU (Central Processing Unit), a ROM (Read Only Memory), and so forth, is provided as the control part 10. The ROM stores programs for various computations. The CPU executes the programs stored in the ROM.

The control part 10 is configured to control the electric motor 21. When the operating switch 3 is turned on, the control part 10 causes the electric motor 21 to output the assist force.

Speaking in detail, when determining that the forward movement switch 3a is turned on, the control part 10 controls the electric motor 21 to output the assist force for forward movement. Accordingly, the electric motor 21 outputs the assist force for forward movement to rotationally drive the drive wheel 203. The processing described herein, executed by the control part 10 to cause the electric motor 21 to output the assist force for forward movement, will be referred to as "forward movement assist processing".

On the other hand, when determining that the reverse movement switch 3b is turned on, the control part 10 controls the electric motor 21 to output the assist force for reverse movement. Accordingly, the electric motor 21 outputs the assist force for reverse movement to rotationally drive the drive wheel 203. The processing described herein, executed by the control part 10 to cause the electric motor 21 to output the assist force for reverse movement, will be referred to as "reverse movement assist processing".

It should be noted that the assist force for forward movement and that for reverse movement can be calculated by the control part 10 based on, for instance, mobile object information regarding the pallet truck 200. It should be noted that the acceleration of the pallet truck 200, the weight of the pallet truck 200 including an object loaded thereon, rolling resistance, power loss, and so forth can be exemplified as the mobile object information.

Specifically, an assist force Fa can be calculated by the control part 10 based on the following formula (1).

[Math. 1]

$$F_\alpha = \alpha F \quad (1)$$

Here, "α" indicates an assist ratio. The assist ratio α is greater than 0 and less than 1.

"F" in the formula (1) can be calculated by the control part 10 based on the following formula (2).

[Math. 2]

$$F = Ma + F_v + F_r + Mg \sin \theta \quad (2)$$

Here, "M" indicates the weight of the pallet truck 200 including an object loaded thereon; "a" indicates the acceleration of the pallet truck 200; "$F_v$" indicates power loss; "$F_r$" indicates rolling resistance; "g" indicates gravitational acceleration; "θ" indicates the tilt angle of the road surface on which the pallet truck 200 travels. The user is allowed to input a value of the weight M.

The power loss $F_v$ can be calculated by the control part 10 based on the following formula (3).

[Math. 3]

$$F_v = kV + C \quad (3)$$

It should be noted that "kV" indicates shaft viscosity resistance; "k" indicates shaft viscosity coefficient. "C" indicates power loss excluding the shaft viscosity resistance and is, for instance, the sum of power loss including transmission loss of a chain or so forth, bearing friction, and so forth.

On the other hand, the rolling resistance $F_r$ can be calculated by the control part 10 based on the following formula (4).

[Math. 4]

$$F_r = C_{rr} Mg \cos \theta \quad (4)$$

It should be noted that "$C_{rr}$" indicates rolling resistance coefficient.

It should be noted that the control part 10 outputs a control signal to the motor driver 22 to control the electric motor 21. The control part 10 determines whether or not the pallet truck 200 is traveling based on, for instance, the velocity, the acceleration, or so forth of the pallet truck 200. Besides, the control part 10 determines in which of the forward and reverse directions the pallet truck 200 is traveling based on the velocity, the acceleration, or so forth of the pallet truck 200.

When determining that the forward movement switch 3a is turned off, and simultaneously, the reverse movement switch 3b is turned off, the control part 10 does not cause the electric motor 21 to output the assist force for forward movement and that for reverse movement. In this case, traveling of the pallet truck 200 is made only by a human drive force. Traveling of the pallet truck, made only by the human drive force as described above, will be hereinafter referred to as "free traveling".

The control part 10 controls the electric motor 21 based on the tilt angle θ of the operating handle 202. First, the control part 10 determines whether the tilt angle θ of the operating handle 202 relative to the vertical axis V is in the first range R1, the second range R2, or the third range R3.

When determining that the tilt angle θ is in the first range R1, the control part 10 does not cause the electric motor 21 to output the assist force even if the forward movement switch 3a is turned on. In other words, when the tilt angle θ is in the first range R1, the control part 10 does not execute the forward movement assist processing. In this case, the user enables the pallet truck 200 to perform free traveling. It should be noted that when the reverse movement switch 3b is turned on, the control part 10 causes, as usual, the electric motor 21 to output the assist force for reverse movement. In other words, the control part 10 executes the reverse movement assist processing.

On the other hand, when determining that the tilt angle θ is in the second range R2, the control part 10 causes, as usual, the electric motor 21 to output the assist force for both forward movement and reverse movement. In other words, when the tilt angle θ is in the second range R2, the control part 10 is enabled to execute the forward movement assist processing and the reverse movement assist processing.

Yet on the other hand, when determining that the tilt angle θ is in the third range R3, the control part 10 does not cause the electric motor 21 to output the assist force even if the forward movement switch 3a is turned on as well as if the reverse movement switch 3b is turned on. Thus, when the tilt angle θ is in the third range R3, the control part 10 neither executes the forward movement assist processing nor the reverse movement assist processing. Because of this, free traveling is only enabled by the pallet truck 200.

When determining that the operating switch 3 is switched off from on during traveling of the pallet truck 200, the control part 10 executes first brake processing for stopping the pallet truck 200. For example, the control part 10 executes the first brake processing when the forward movement switch 3a is switched off from on during forward movement of the pallet truck 200, or alternatively, when the reverse movement switch 3b is switched off from on during reverse movement of the pallet truck 200. When determining that the pallet truck 200 has been stopped, the control part 10 stops executing the first brake processing.

For example, regenerative braking of the electric motor 21, short braking of the electric motor 21, and so forth can be exemplified as the first brake processing. The control part 10 outputs a control signal to the motor driver 22 such that regenerative braking or short braking of the electric motor 21 can be executed. It should be noted that a brake device can be installed in the pallet truck 200; then, the control part 10 can control the brake device to stop the pallet truck 200.

The control part 10 executes the first brake processing after elapse of a predetermined waiting time. In other words, when determining that the forward movement switch 3a is switched off from on or that the reverse movement switch 3b is switched off from on, the control part 10 executes the first brake processing after elapse of the predetermined waiting time without executing the first brake processing immediately.

It should be noted that the predetermined waiting time can be set to about 0.3 to 1.0 second, for instance, albeit not particularly limited thereto. Besides, the predetermined waiting time can be set to a fixed time preliminarily stored in the control part 10. It should be noted that alternatively, the waiting time can be set by the control part 10 depending on the velocity or weight of the pallet truck 200. For example, the waiting time can be reduced by the control part 10 with increase in velocity of the pallet truck 200. Alternatively, the waiting time can be reduced by the control part 10 with increase in weight of the pallet truck 200 (including the object loaded thereon).

When determining that both the forward movement switch 3a and the reverse movement switch 3b are turned on during traveling the pallet truck 200, the control part 10 executes a second brake processing for stopping the pallet truck 200. When determining that the pallet truck 200 has been stopped, the control part 10 stops executing the second brake processing.

For example, when the user operates (pushes) both the forward movement switch 3a and the reverse movement switch 3b during free traveling of the pallet truck 200, the control part 10 executes the second brake processing.

On the other hand, under the condition that the user operates the forward movement switch 3a to cause the pallet truck 200 to perform forward movement-assisted traveling, the control part 10 executes the second brake processing when the user further operates the reverse movement switch 3b, while keeping operating the forward movement switch 3a.

Yet on the other hand, under the condition that the user operates the reverse movement switch 3b to cause the pallet truck 200 to perform reverse movement-assisted traveling, the control part 10 executes the second brake processing when the user further operates the forward movement switch 3a, while keeping operating the reverse movement switch 3b.

It should be noted that for example, regenerative braking of the electric motor 21, short braking of the electric motor 21, and so forth can be exemplified as the second brake processing. The control part 10 outputs a control signal to the motor driver 22 such that regenerative braking or short braking of the electric motor 21 can be executed. It should be noted that the brake device described above or another brake device can be installed in the pallet truck 200; then, the control part 10 can control the brake device to stop the pallet truck 200. A brake force generated in the second brake processing can be equal in magnitude to or different in magnitude from that generated in the first brake processing.

The control part 10 can execute a third brake processing for stopping the pallet truck 200 when determining that the reverse movement switch 3b is turned on during forward movement of the pallet truck 200 or that the forward movement switch 3a is turned on during reverse movement of the pallet truck 200. It should be noted that regenerative braking of the electric motor 21, short braking of the electric motor 21, braking of the brake device, and so forth can be exemplified as the third brake processing similarly to those exemplified as the second brake processing. When determining that the pallet truck 200 has been stopped, the control part 10 stops executing the third brake processing.

The control part 10 executes each of the first to third brake processing with a brake force depending in magnitude on the assist force of the electric motor 21. For example, the control part 10 increases the brake force in each of the first to third brake processing with increase in magnitude of the assist force of the electric motor 21. It should be noted that the control part 10 can execute each of the first to third brake processing with a fixed brake force regardless of the magnitude of the assist force of the electric motor 21.

[Control Method]

Figure 3:
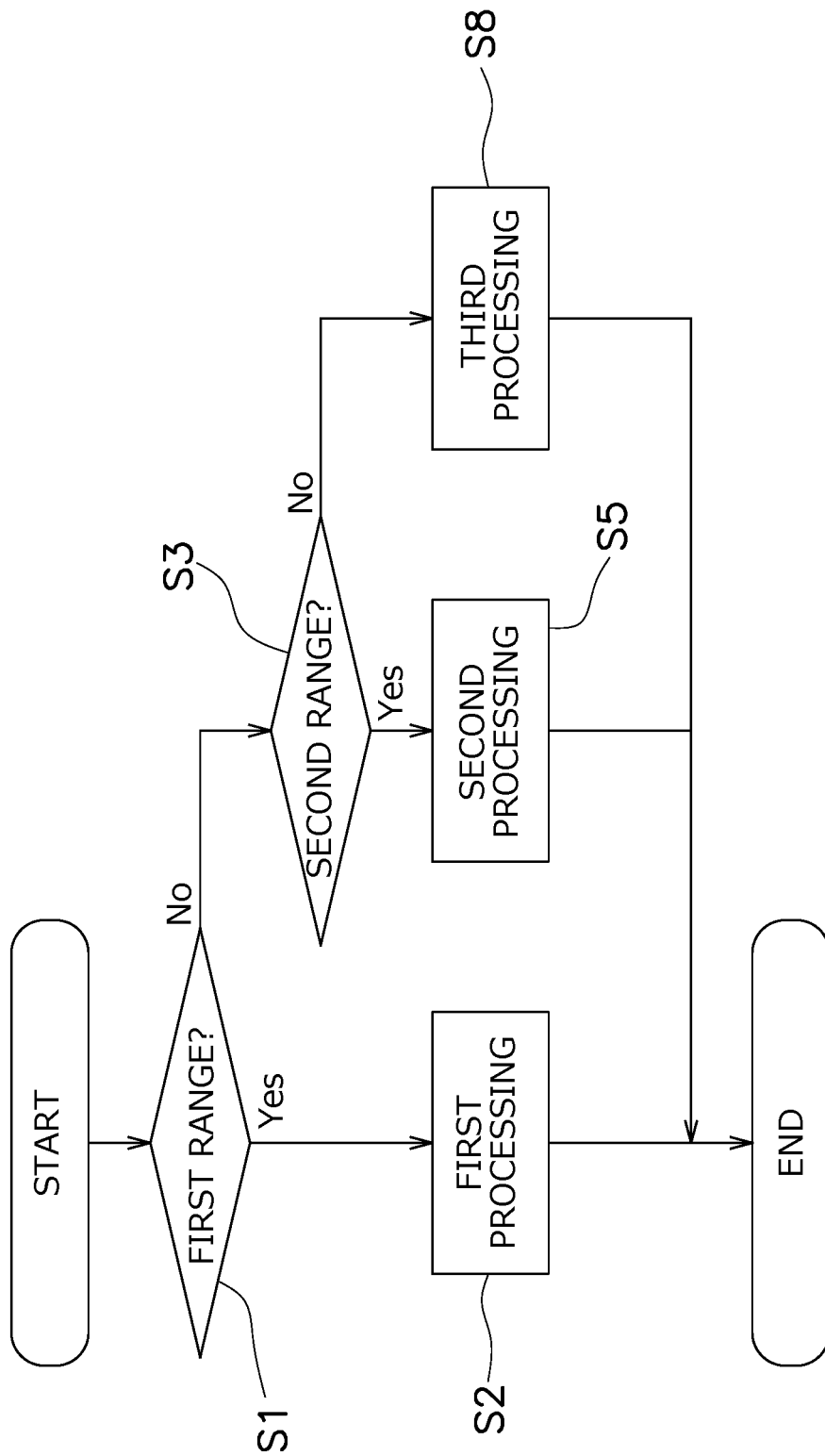
FIG. 3 is a flowchart showing a plurality of processing executed by a control part.

Next, an example of a plurality of processing executed by the control part 10 will be explained with reference to a flowchart shown in FIG. 3.

First, based on the tilt angle $\theta$ detected by the tilt angle detection part 4, the control part 10 determines whether the tilt angle $\theta$ is in the first range R1, the second range R2, or the third range R3. Specifically, the control part 10 determines whether or not the tilt angle $\theta$ is in the first range R1 (step S1).

When determining that the tilt angle $\theta$ is in the first range R1 (Yes in step S1), the control part 10 executes first processing to be described (step S2).

Next, the control part 10 determines whether or not the tilt angle $\theta$ is in the second range R2 (step S3). When determining that the tilt angle $\theta$ is in the second range R2 (Yes in step S3), the control part 10 executes second processing to be described (step S5). Conversely, when determining that the tilt angle $\theta$ is not in the second range R2 (No in step S3), the control part 10 executes third processing to be described (step S8).

Figure 4:
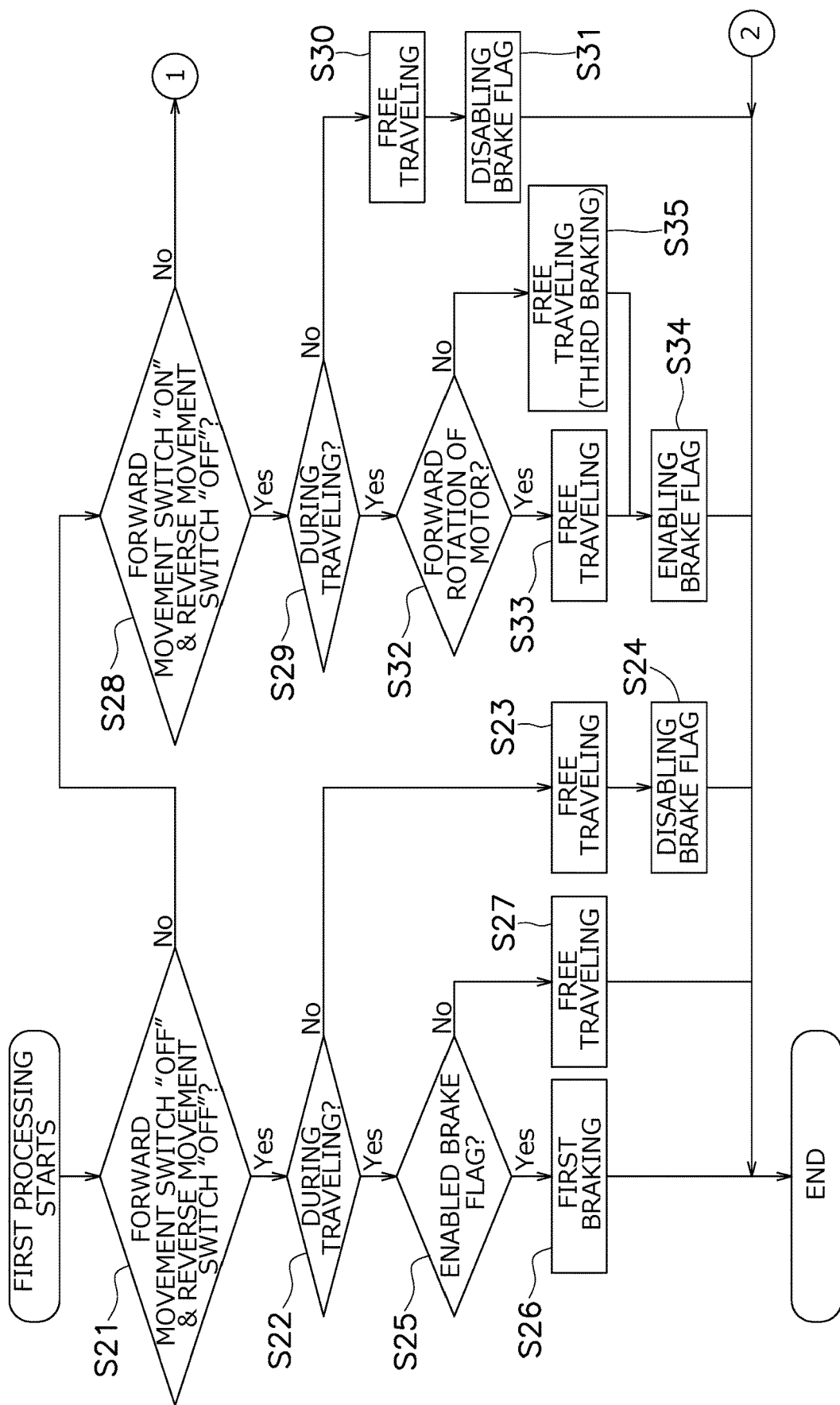
FIG. 4 is a flowchart showing one processing executed by the control part.

The first processing will be explained with reference to flowcharts shown in FIGS. 4 and 5.

First, the control part 10 determines whether or not the following condition is satisfied: the forward movement switch 3a is turned off, and simultaneously, the reverse movement switch 3b is turned off (step S21). When determining that the following condition is satisfied: the forward movement switch 3a is turned off, and simultaneously, the reverse movement switch 3b is turned off (Yes in step S21), the control part 10 next determines whether or not the pallet truck 200 is traveling (step S22).

When determining that the pallet truck 200 is not traveling (No in step S22), the control part 10 causes the electric motor 21 not to output the assist force. In other words, the control part 10 enables the pallet truck 200 to perform free traveling (step S23). Then, the control part 10 executes processing for disabling a brake flag (step S24). It should be noted that as described below, the brake flag is enabled when the operating switch 3 is operated during traveling.

Conversely, when determining that the pallet truck 200 is traveling (Yes in step S22), the control part 10 determines whether or not the brake flag is enabled (step S25).

When determining that the brake flag is enabled (Yes in step S25), the control part 10 executes the first brake processing (step S26). Conversely, when determining that the brake flag is not enabled (No in step S25), the control part 10 causes the electric motor 21 not to output the assist force. In other words, the control part 10 enables the pallet truck 200 to perform free traveling (step S27).

When determining in step S21 described above that the following condition is not satisfied: the forward movement switch 3a is turned off, and simultaneously, the reverse movement switch 3*b* is turned off (No in step S21), the control part 10 next determines whether or not the following condition is satisfied: the forward movement switch 3*a* is turned on, and simultaneously, the reverse movement switch 3*b* is turned off (step S28).

When determining that the following condition is satisfied: the forward movement switch 3*a* is turned on, and simultaneously, the reverse movement switch 3*b* is turned off (Yes in step S28), the control part 10 next determines whether or not the pallet truck 200 is traveling (step S29).

When determining that the pallet truck 200 is not traveling (No in step S29), the control part 10 causes the electric motor 21 not to output the assist force. In other words, the control part 10 enables the pallet truck 200 to perform free traveling (step S30). Then, the control part 10 executes processing for disabling the brake flag (step S31).

Conversely, when determining that the pallet truck 200 is traveling (Yes in step S29), the control part 10 next determines whether or not the electric motor 21 is forwardly rotated (step S32). It should be noted that when the electric motor 21 is forwardly rotated, the pallet truck 200 is forwardly moved. Because of this, in step S32, the control part 10 can determine whether or not the pallet truck 200 is forwardly moved instead of determining whether or not the electric motor 21 is forwardly rotated.

When determining that the electric motor 21 is forwardly rotated (Yes in step S32), the control part 10 causes the electric motor 21 not to output the assist force. In other words, the control part 10 enables the pallet truck 200 to perform free traveling (step S33). Then, the control part 10 executes processing for enabling the brake flag (step S34).

When determining that the electric motor 21 is not forwardly rotated (No in step S32), in other words, when determining that the electric motor 21 is reversely rotated, the control part 10 causes the electric motor 21 not to output the assist force. In other words, the control part 10 enables the pallet truck 200 to perform free traveling (step S35). It should be noted that in step S35, the control part 10 can execute the third brake processing for stopping traveling of the pallet truck 200 instead of enabling the pallet truck 200 to perform free traveling.

Figure 5:
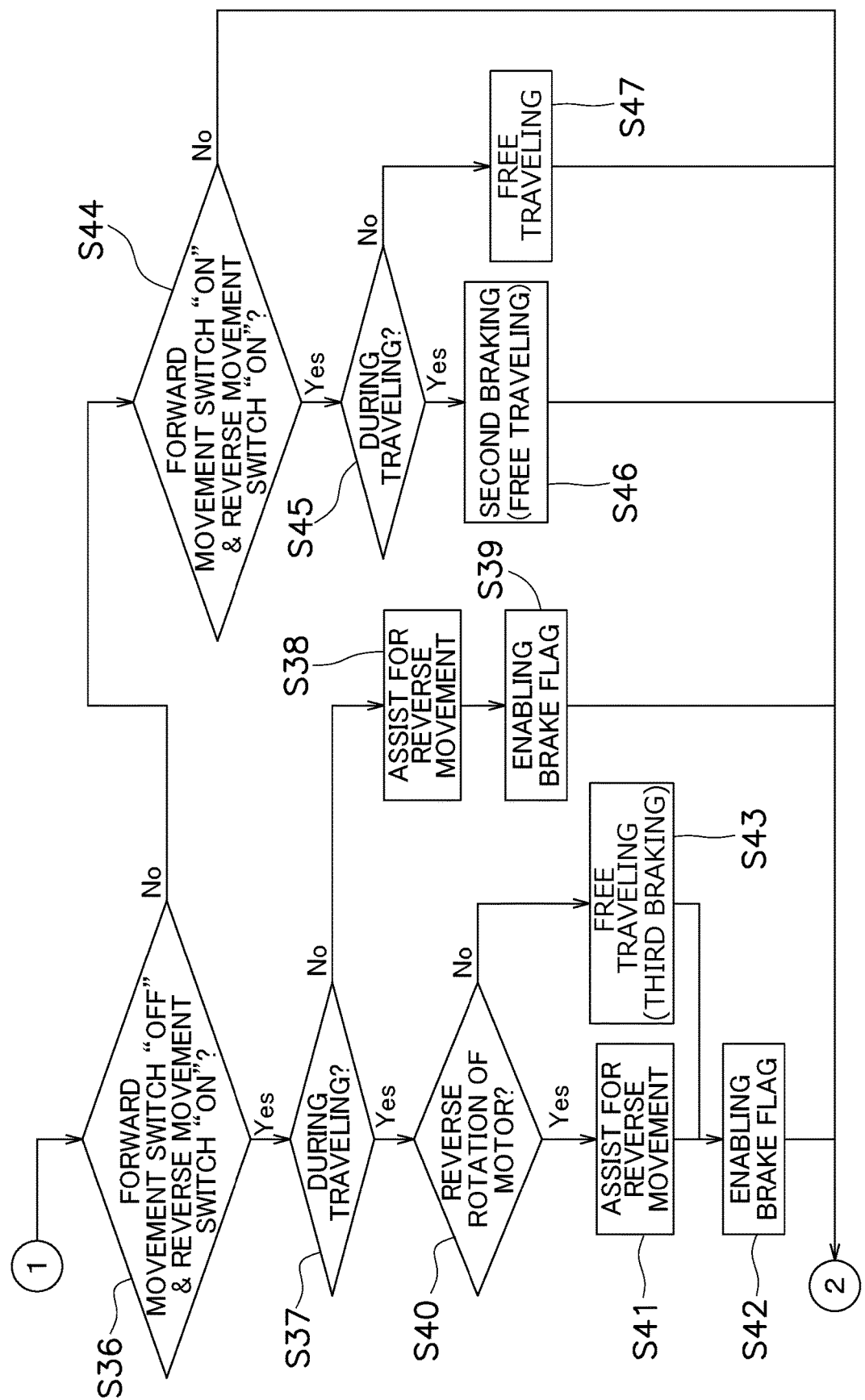
FIG. 5 is a flowchart showing the one processing executed by the control part.

When determining in step S28 described above that the following condition is not satisfied: the forward movement switch 3*a* is turned on, and simultaneously, the reverse movement switch 3*b* is turned off (No in step S28), the control part 10 determines whether or not the following condition is satisfied: the forward movement switch 3*a* is turned off, and simultaneously, the reverse movement switch 3*b* is turned on (step S36) as shown in FIG. 5.

When determining that the following condition is satisfied: the forward movement switch 3*a* is turned off, and simultaneously, the reverse movement switch 3*b* is turned on (Yes in step S36), the control part 10 next determines whether or not the pallet truck 200 is traveling (step S37).

When determining that the pallet truck 200 is not traveling (No in step S37), the control part 10 executes the reverse movement assist processing (step S38). In other words, the control part 10 causes the electric motor 21 to output the assist force for reverse movement. Then, the control part 10 executes processing for enabling the brake flag (step S39).

Conversely, when determining that the pallet truck 200 is traveling (Yes in step S37), the control part 10 next determines whether or not the electric motor 21 is reversely rotated (step S40). It should be noted that when the electric motor 21 is reversely rotated, the pallet truck 200 is reversely moved. Because of this, in step S40, the control part 10 can determine whether or not the pallet truck 200 is reversely moved instead of determining whether or not the electric motor 21 is reversely rotated.

When determining that the electric motor 21 is reversely rotated (Yes in step S40), the control part 10 executes the reverse movement assist processing (step S41). In other words, the control part 10 causes the electric motor 21 to output the assist force for reverse movement. Accordingly, the pallet truck 200 performs reverse movement-assisted traveling. Then, the control part 10 executes processing for enabling the brake flag (step S42).

When determining that the electric motor 21 is not reversely rotated (No in step S40), in other words, when determining that the electric motor 21 is forwardly rotated, the control part 10 causes the electric motor 21 not to output the assist force. In other words, the control part 10 enables the pallet truck 200 to perform free traveling (step S43). It should be noted that in step S43, the control part 10 can execute the third brake processing for stopping traveling of the pallet truck 200 instead of enabling the pallet truck 200 to perform free traveling.

When determining in step S36 described above that the following condition is not satisfied: the forward movement switch 3*a* is turned off, and simultaneously, the reverse movement switch 3*b* is turned on (No in step S36), the control part 10 next determines whether or not the following condition is satisfied: the forward movement switch 3*a* is turned on, and simultaneously, the reverse movement switch 3*b* is turned on (step S44).

When determining that the following condition is satisfied: the forward movement switch 3*a* is turned on, and simultaneously, the reverse movement switch 3*b* is turned on (Yes in step S44), the control part 10 next determines whether or not the pallet truck 200 is traveling (step S45).

When determining that the pallet truck 200 is traveling (Yes in step S45), the control part 10 executes the second brake processing (step S46). Conversely, when determining that the pallet truck 200 is not traveling (No in step S45), the control part 10 causes the electric motor 21 not to output the assist force. In other words, the control part 10 enables the pallet truck 200 to perform free traveling (step S47).

Figure 6:
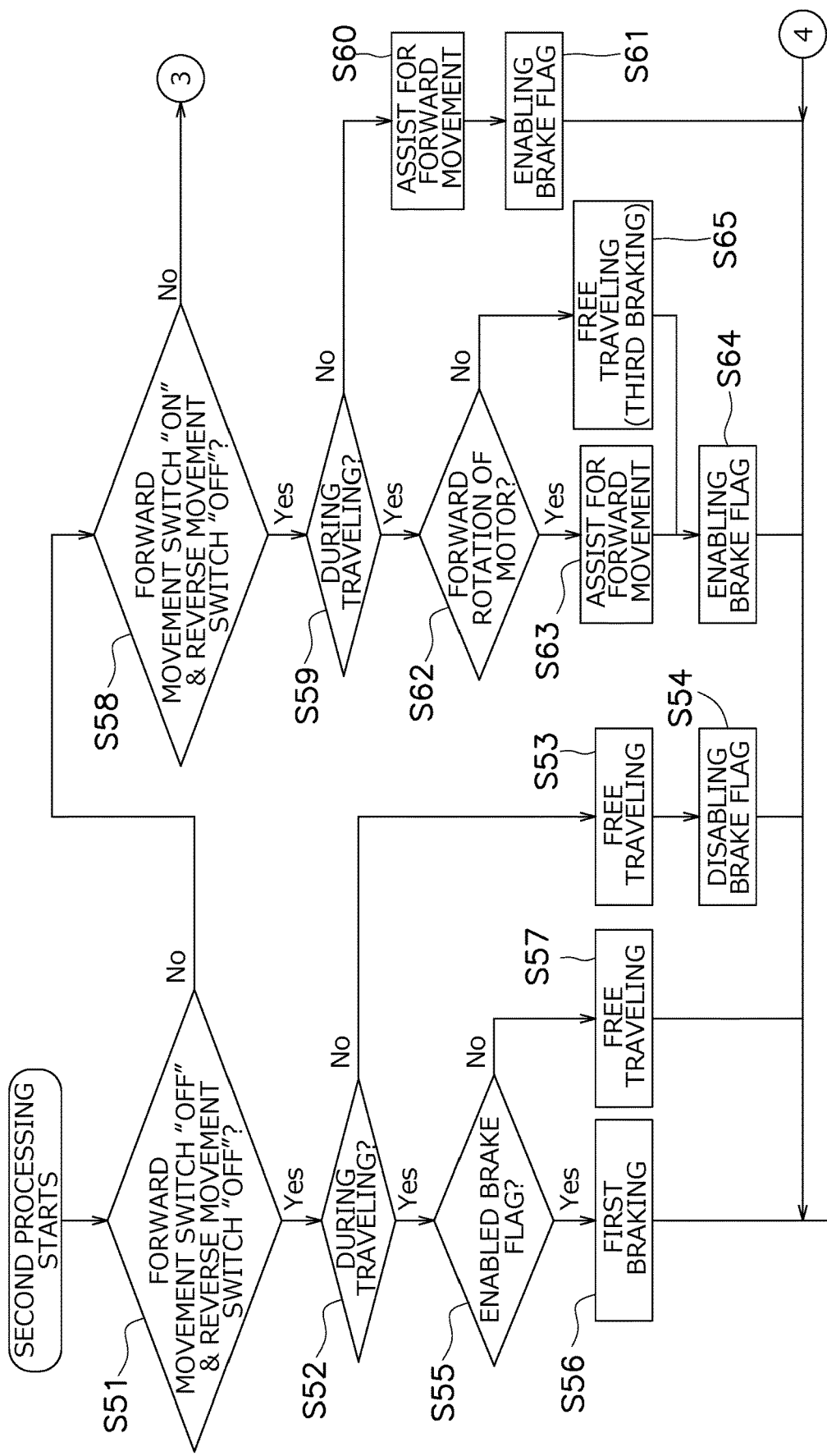
FIG. 6 is a flowchart showing another processing executed by the control part.
Figure 7:
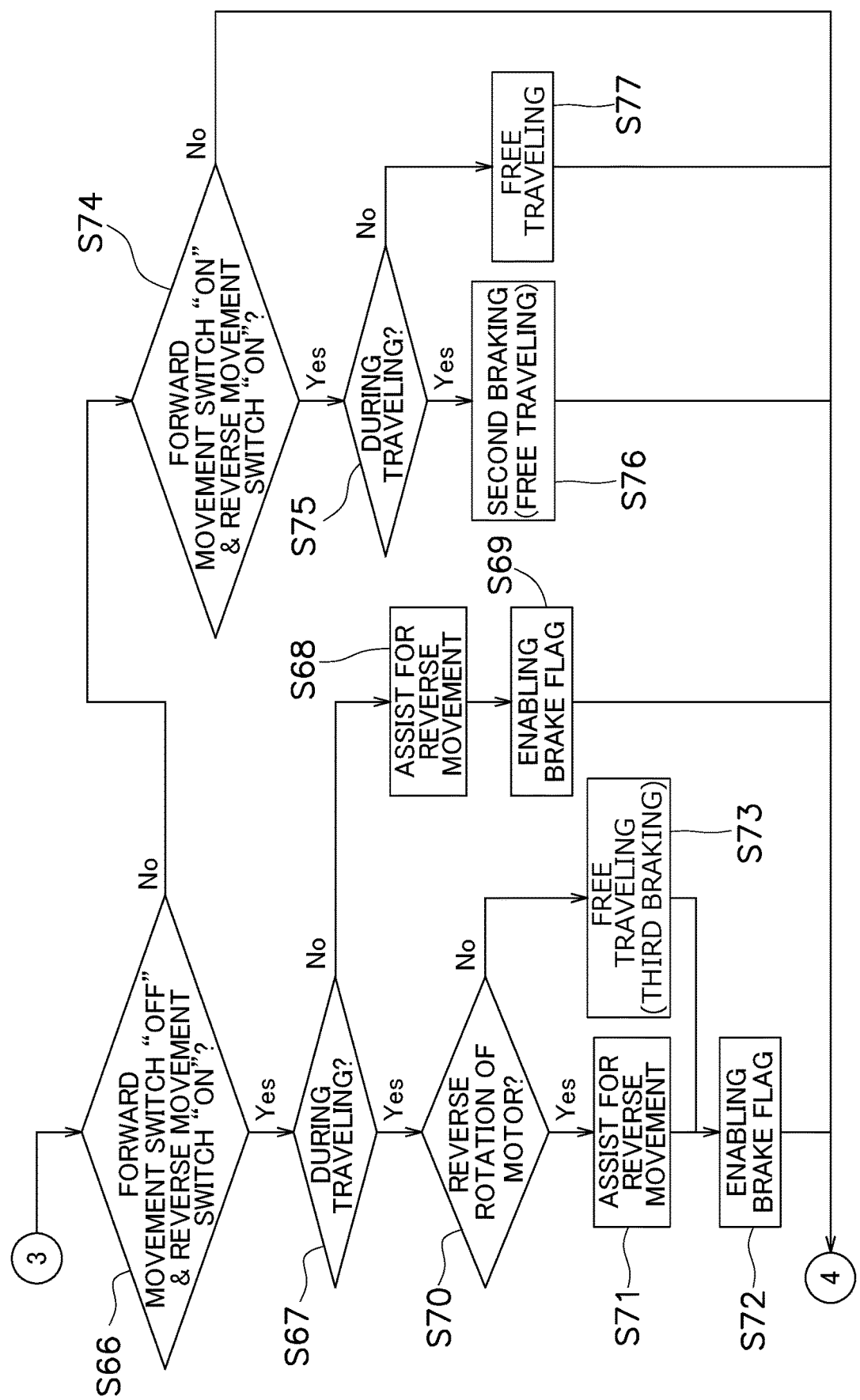
FIG. 7 is a flowchart showing the another processing executed by the control part.

The second processing will be explained with reference to flowcharts shown in FIGS. 6 and 7.

It should be noted that processing steps S51 to S57 in the second processing are identical to the processing steps S21 to S27 in the first processing described above; hence, the explanation thereof will be omitted. Besides, processing steps S66 to S77 in the second processing are identical to the processing steps S36 to S47 in the first processing described above; hence, the explanation thereof will be omitted.

The control part 10 determines whether or not the following condition is satisfied: the forward movement switch 3*a* is turned on, and simultaneously, the reverse movement switch 3*b* is turned off (step S58).

When determining that the following condition is satisfied: the forward movement switch 3*a* is turned on, and simultaneously, the reverse movement switch 3*b* is turned off (Yes in step S58, the control part 10 next determines whether or not the pallet truck 200 is traveling (step S59).

When determining that the pallet truck 200 is not traveling (No in step S59), the control part 10 executes the forward movement assist processing (step S60). In other words, the control part 10 causes the electric motor 21 to output the assist force for forward movement. Then, the control part 10 executes processing for enabling the brake flag (step S61).

Conversely, when determining that the pallet truck 200 is traveling (Yes in step S59), the control part 10 next determines whether or not the electric motor 21 is forwardly rotated (step S62). It should be noted that in step S62, the control part 10 can determine whether or not the pallet truck 200 is forwardly moved instead of determining whether or not the electric motor 21 is forwardly rotated.

When determining that the electric motor 21 is forwardly rotated (Yes in step S62), the control part 10 executes the forward movement assist processing (step S63). In other words, the control part 10 causes the electric motor 21 to output the assist force for forward movement. Then, the control part 10 executes processing for enabling the brake flag (step S64).

When determining that the electric motor 21 is not forwardly rotated (No in step S62), in other words, when determining that the electric motor 21 is reversely rotated, the control part 10 causes the electric motor 21 not to output the assist force. In other words, the control part 10 enables the pallet truck 200 to perform free traveling (step S65). It should be noted that in step S65, the control part 10 can execute the third brake processing for stopping traveling of the pallet truck 200 instead of enabling the pallet truck 200 to perform free traveling.

Figure 8:
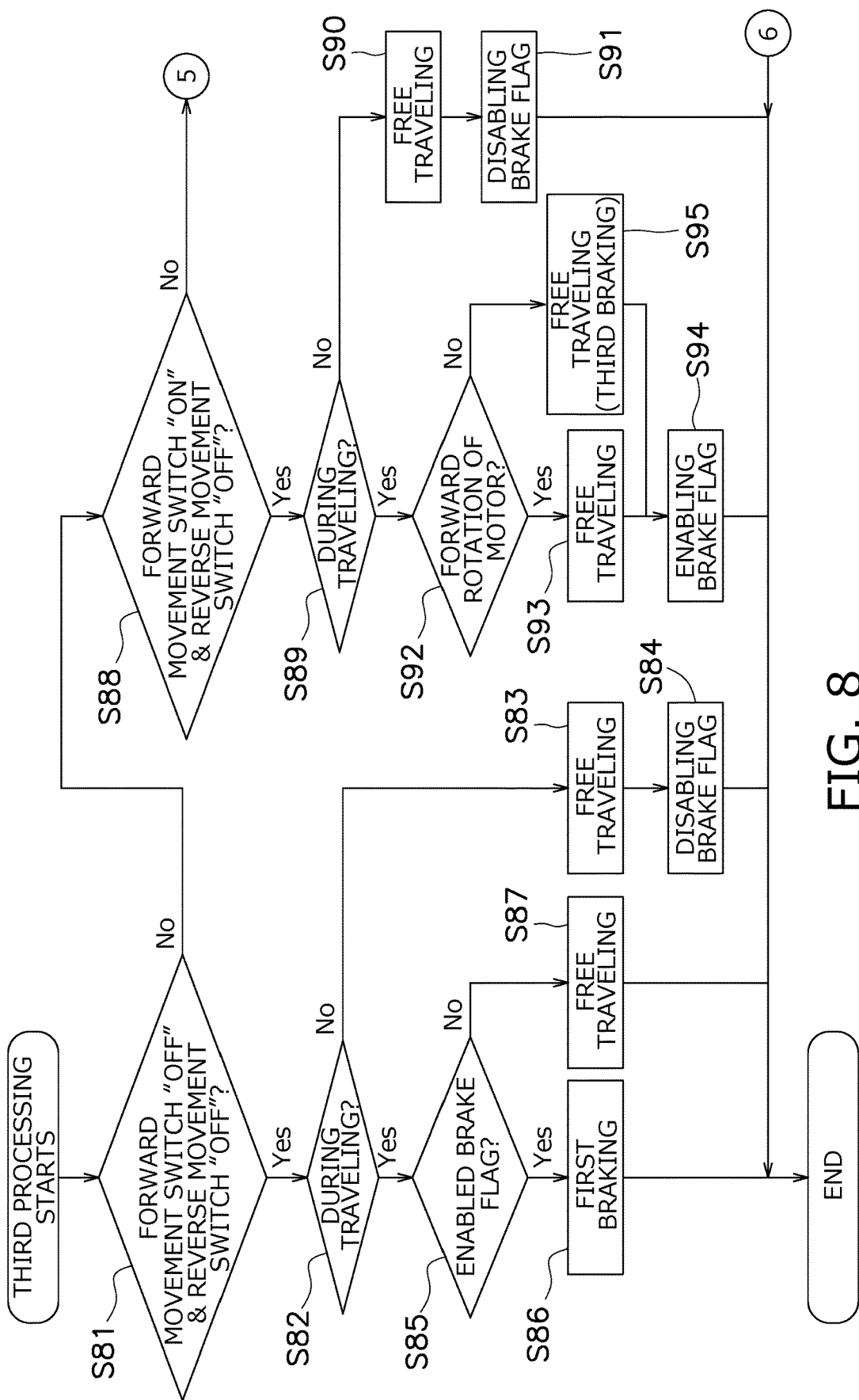
FIG. 8 is a flowchart showing yet another processing executed by the control part.

The third processing will be explained with reference to flowcharts shown in FIGS. 8 and 9.

It should be noted that processing steps S81 to S95 in the third processing are identical to the processing steps S21 to S35 in the first processing described above; hence, the explanation thereof will be omitted. Besides, processing steps S104 to S107 in the third processing are identical to the processing steps S44 to S47 in the first processing described above; hence, the explanation thereof will be omitted.

Figure 9:
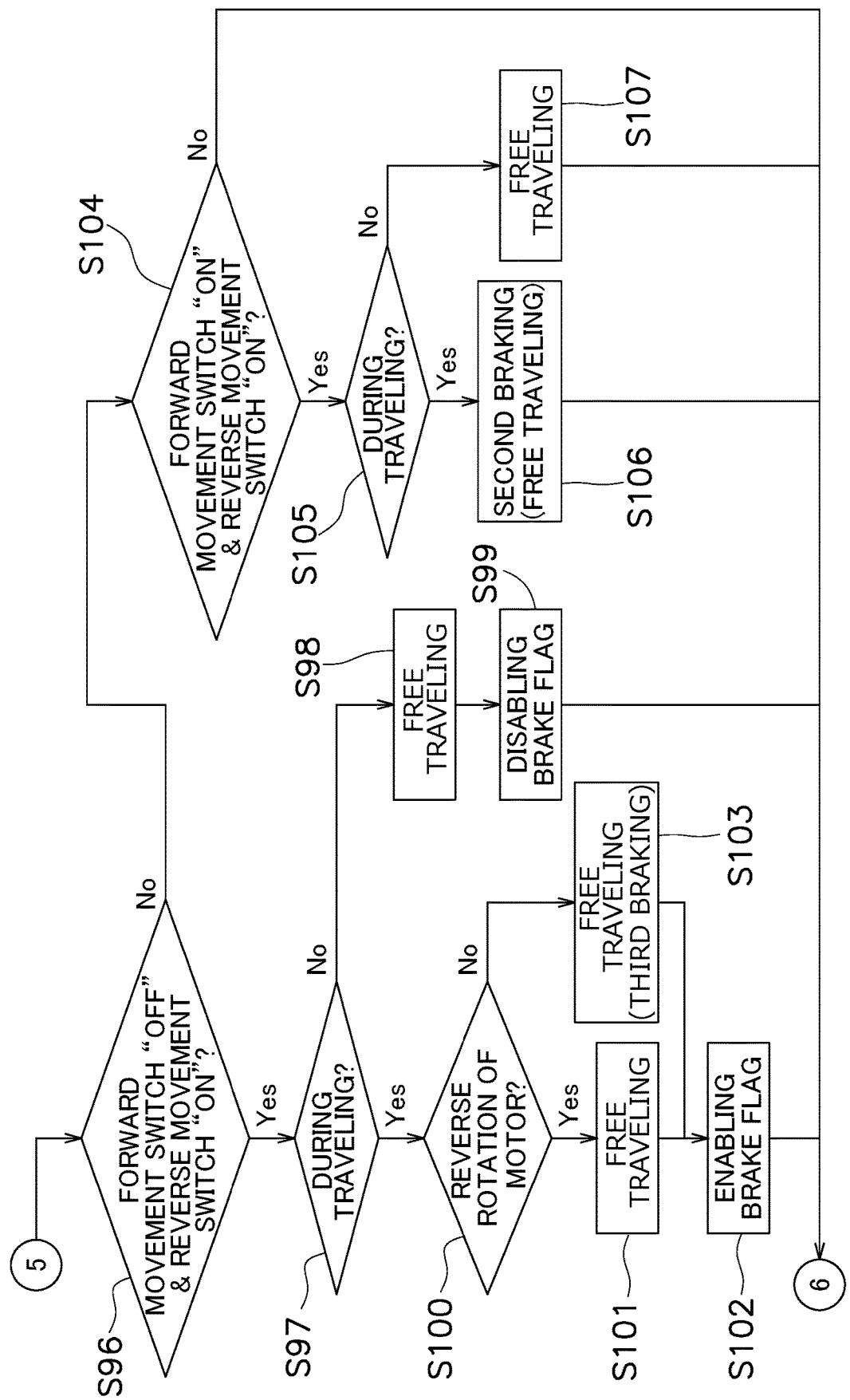
FIG. 9 is a flowchart showing the yet another processing executed by the control part.

As shown in FIG. 9, the control part 10 determines whether or not the following condition is satisfied: the forward movement switch 3a is turned off, and simultaneously, the reverse movement switch 3b is turned on (step S96).

When determining that the following condition is satisfied: the forward movement switch 3a is turned off, and simultaneously, the reverse movement switch 3b is turned on (Yes in step S96), the control part 10 next determines whether or not the pallet truck 200 is traveling (step S97).

When determining that the pallet truck 200 is not traveling (No in step S97), the control part 10 causes the electric motor 21 not to output the assist force. In other words, the control part 10 enables the pallet truck 200 to perform free traveling (step S98). Then, the control part 10 executes processing for disabling the brake flag (step S99).

Conversely, when determining that the pallet truck 200 is traveling (Yes in step S97), the control part 10 next determines whether or not the electric motor 21 is reversely rotated (step S100). It should be noted that in step S100, the control part 10 can determine whether or not the pallet truck 200 is reversely moved instead of determining whether or not the electric motor 21 is reversely rotated.

When determining that the electric motor 21 is reversely rotated (Yes in step S100), the control part 10 causes the electric motor 21 not to output the assist force. In other words, the control part 10 enables the pallet truck 200 to perform free traveling (step S101). Then, the control part 10 executes processing for enabling the brake flag (step S102).

When determining that the electric motor 21 is not reversely rotated (No in step S100), in other words, when determining that the electric motor 21 is forwardly rotated, the control part 10 causes the electric motor 21 not to output the assist force. In other words, the control part 10 enables the pallet truck 200 to perform free traveling (step S103). It should be noted that in step S103, the control part 10 can execute the third brake processing for stopping traveling of the pallet truck 200 instead of enabling the pallet truck 200 to perform free traveling.

Figure 10:
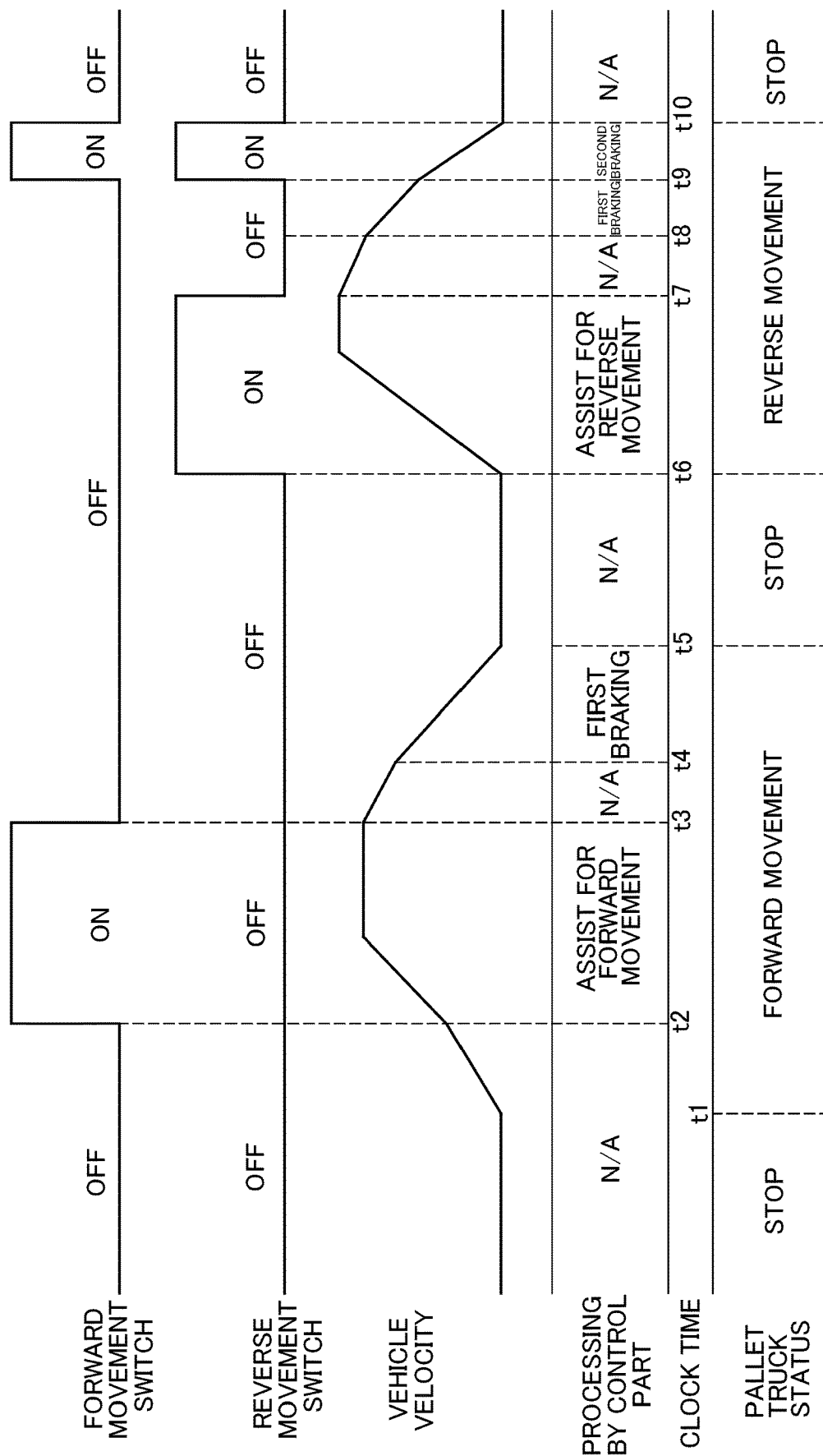
FIG. 10 is a timing chart for explaining traveling of the pallet truck.

Next, the traveling state of the pallet truck 200 will be explained with reference to a timing chart shown in FIG. 10. First, a human drive force does not act on the pallet truck 200 until clock time t1. Besides, the forward movement switch 3a and the reverse movement switch 3b are turned off, hence, the electric motor 21 does not output an assist force. Because of this, the pallet truck 200 stands still.

From clock time t1 to clock time t2, the human drive force acts on the pallet truck 200, whereby the pallet truck 200 is forwardly moved. It should be noted that the forward movement switch 3a and the reverse movement switch 3b are turned off, hence, the electric motor 21 does not output the assist force. In other words, the pallet truck 200 performs free traveling.

At clock time t2, the forward movement switch 3a is turned on; accordingly, the control part 10 executes the forward movement assist processing, whereby the electric motor 21 outputs the assist force for forward movement. Because of this, the pallet truck 200 performs forward movement-assisted traveling.

At clock time t3, the forward movement switch 3a is switched off from on; hence, at clock time t4 after elapse of a predetermined waiting time, the control part 10 executes the first brake processing. Because of this, the pallet truck 200 decelerates and finally stops moving.

The pallet truck 200 thus stops moving; hence, at clock time t5, the control part 10 stops executing the first brake processing. It should be noted that at this time, the electric motor 21 does not output the assist force.

At clock time t6, the reverse movement switch 3b is turned on; accordingly, the control part 10 executes the reverse movement assist processing.

At clock time t7, the reverse movement switch 3b is switched off from on; hence, at clock time t8 after elapse of a predetermined waiting time, the control part 10 executes the first brake processing. Then at clock time 19, both the forward movement switch 3a and the reverse movement switch 3b are turned on; accordingly, the control part 10 executes the second brake processing. It should be noted that in this example, a brake force generated in the second brake processing is greater in magnitude than that generated in the first brake processing. With the first and second brake processing, the pallet truck 200 decelerates and finally stops moving.

[Modifications]

One embodiment of the present invention has been explained above. However, the present invention is not limited to the above, and a variety of changes can be made without departing from the gist of the present invention.

(a) In the embodiment described above, the operating switch 3 is configured to include two switches: the forward movement switch 3a and the reverse movement switch 3b. However, the configuration of the operating switch 3 is not limited to this. For example, a single switch can be provided as the operating switch 3. In this case, the operating switch 3 is switched from one to another among three states: a first on state, a second on state, and an off state.

The first on state of the operating switch 3 corresponds to one of the states in the embodiment described above: the forward movement switch 3a is turned on, and simultaneously, the reverse movement switch 3b is turned off. On the other hand, the second on state of the operating switch 3 corresponds to another of the states in the embodiment described above: the reverse movement switch 3b is turned on, and simultaneously, the forward movement switch 3*a* is turned off. Yet on the other hand, the off state of the operating switch 3 corresponds to yet another of the states in the embodiment described above: the forward movement switch 3*a* is turned off, and simultaneously, the reverse movement switch 3*b* is turned off.

When operated by the user, the operating switch 3 can be set to either the first on state or the second on state. Conversely, when released from being operated by the user, the operating switch 3 is configured to be returned to the off state. In other words, the operating switch 3 is of a momentary type.

Specifically, the operating switch 3 is a toggle switch. Only while the user tilts the operating switch 3 to a first side, the operating switch 3 is set to the first on state. Then, when the user takes the hand off the operating switch 3, the operating switch 3 is set to the off state. On the other hand, only while the user tilts the operating switch 3 to a second side opposite to the first side, the operating switch 3 is set to the second on state. Then, when the user takes the hand off the operating switch 3, the operating switch 3 is set to the off state.

When the operating switch 3 is set to the first on state, the control part 10 executes the forward movement assist processing. In other words, the control part 10 controls the electric motor 21 to output the assist force for forward movement. Thus, when the operating switch 3 is set to the first on state, the control part 10 executes processing identical to that executed when the forward movement switch 3*a* is turned on in the embodiment described above.

When the operating switch 3 is set to the second on state, the control part 10 executes the reverse movement assist processing. In other words, the control part 10 controls the electric motor 21 to output the assist force for reverse movement. Thus, when the operating switch 3 is set to the second on state, the control part 10 executes processing identical to that executed when the reverse movement switch 3*b* is turned on in the embodiment described above.

The control part 10 does not execute the second brake processing in the embodiment described above but executes the first and third brake processing in the embodiment described above.

Specifically, the control part 10 executes the first brake processing when determining that the operating switch 3 is switched from either the first on state or the second on state to the off state during traveling of the pallet truck 200. More specifically, the control part 10 executes the first brake processing when determining that the operating switch 3 is switched from the first on state to the off state during forward movement of the pallet truck 200. Likewise, the control part 10 executes the first brake processing when determining that the operating switch 3 is switched from the second on state to the off state during reverse movement of the pallet truck 200.

The control part 10 executes the third brake processing when determining that the operating switch 3 is switched between the first on state and the second on state during traveling of the pallet truck 200.

Specifically, the control part 10 executes the third brake processing when determining that the operating switch 3 is switched from the first on state to the second on state during forward movement of the pallet truck 200. Likewise, the control part 10 executes the third brake processing when determining that the operating switch 3 is switched from the second on state to the first on state during reverse movement of the pallet truck 200.

In this modification, the operating switch 3 is not set to a state corresponding to still yet another of the states in the embodiment described above: the forward movement switch 3*a* is turned on, and simultaneously, the reverse movement switch 3*b* is turned on. Hence, the control part 10 does not execute the processing steps S44 to S47, the processing steps S74 to S77, and the processing steps S104 to S107 in the embodiment described above.

(b) The control part 10 can stop calculating the assist force either until the pallet truck 200 reaches a preliminarily set vehicle velocity from starting of assist control or until a preliminarily set time elapses after starting of assist control. The control part 10 can set the assist force to a preliminarily set value instead of calculating the assist force. It should be noted that the preliminarily set value may not be a fixed value. Besides, starting of assist control can be defined as the timing when the forward movement switch 3*a* or the reverse movement switch 3*b* is turned on.

The control part 10 can set the assist force to zero when determining that the pallet truck 200 stands still even after elapse of a preliminarily set time. Alternatively, the control part 10 can control the assist force based on both the vehicle velocity and the elapsed time.

REFERENCE SIGNS LIST

3: Operating switch
3*a*: Forward movement switch
3*b*: Reverse movement switch
10: Control part
21: Electric motor
100: Control device
200: Pallet truck

What is claimed is:

1. A load transport-assist device, comprising:
   an assist-device body, comprising
      a ground-engaging drive wheel;
      a load-supporting platform that extends forwardly from the ground-engaging drive wheel in proximity to the ground; and
      a pivoting operation handle that extends upwardly from a pivot point located near the load-supporting platform;
   an electric motor that drives the drive wheel in a forward direction as well as a backward direction; and
   a brake control device comprising
      first and second operating switches disposed on a grasp portion of the pivoting operation handle that each control operation of the electric motor, with each operating switch being configured to be turned on when operated by a user and to be turned off when released from being operated by the user, the first operating switch causing the electric motor to generate a forward-acting force and the second operating switch causing the electric motor to generate a rearward-acting force; and
      a control part configured to execute first brake processing to stop the movement assist device when the control part determines that the first operating switch is switched from on to off during forward traveling of the load-transport assist device, with execution of the first brake processing also being a function of the pivotal position of the pivoting operation handle.

2. The load transport-assist device according to claim 1, wherein the control part is further configured to execute the first brake processing after elapse of a predetermined waiting time.

3. The load transport-assist device according to claim 1, wherein the control part is further configured to execute second brake processing to stop the movement assist device when determining that both the first operating switch and the second operating switch are turned on during traveling of the movement assist device.

4. The load transport-assist device according to claim 1, wherein the control part is further configured to execute third brake processing to stop the movement assist device when the control part determines either that the second switch is turned on during forward movement of the movement assist device or that the first switch is turned on during reverse movement of the movement assist device.

5. The load transport-assist device according to claim 1, wherein
   the control part is further configured to control the electric motor to output an assist force for forward movement when the first operating switch is turned on as a first on state, the control part being further configured to control the electric motor to output the assist force for reverse movement when the second operating switch is turned on as a second on state, and
   the control part is further configured to execute third brake processing to stop the movement assist device when the control part determines that activation of the first and second operating switches has switched between the first on state and the second on state during traveling of the movement assist device.

6. The load transport-assist device according to claim 1, wherein the control part executes the first brake processing with a brake force depending on the assist force of the electric motor.

\* \* \* \* \*